Dec. 20, 1966 V. Z. SMITH 3,293,495
CONTROL CIRCUITS
Filed Jan. 29, 1963
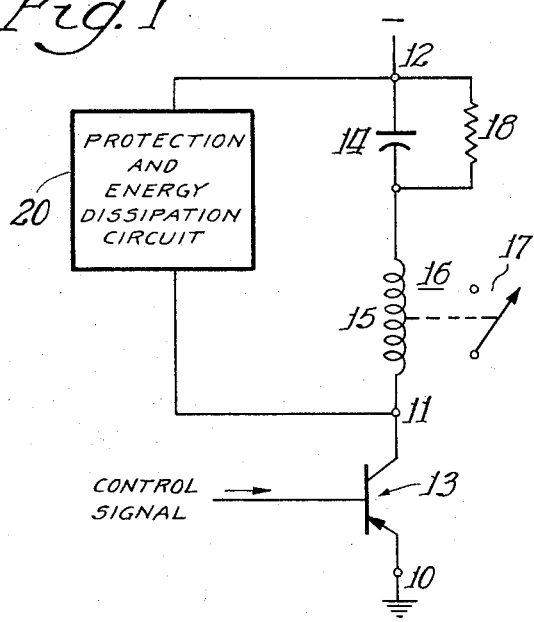
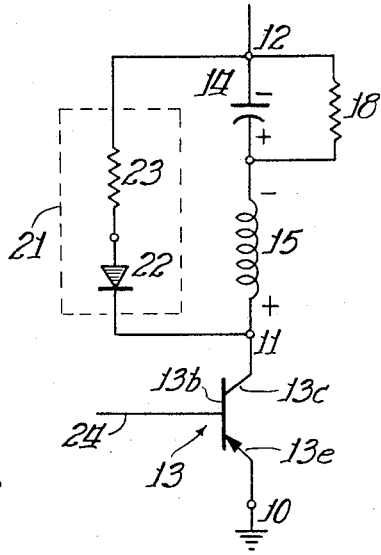
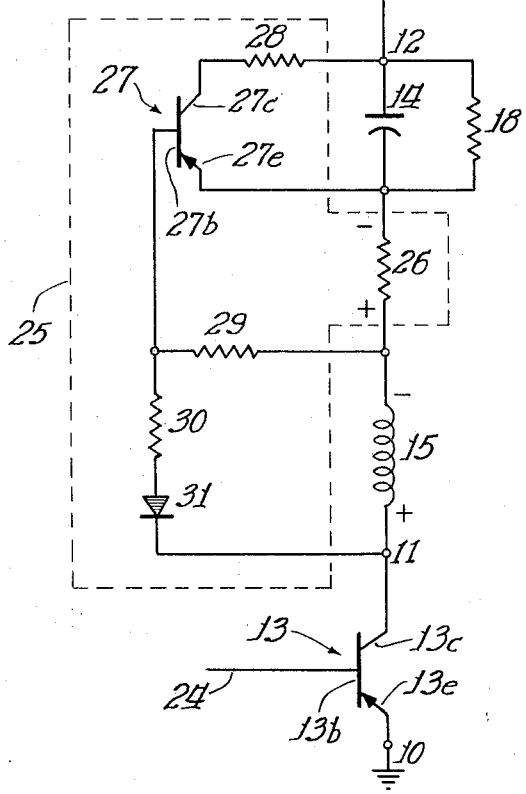
Inventor:
Vernon Z. Smith
By: James F. Jenninge, Jr. Atty.

ized Dec. 20, 1966

United States Patent Office 3,293,495
Patented Dec. 20, 1966

3,293,495
CONTROL CIRCUITS
Vernon Z. Smith, Wayne, Pa., assignor to Omnitronics, Inc., Philadelphia, Pa., a corporation of Delaware
Filed Jan. 29, 1963, Ser. No. 254,623
7 Claims. (Cl. 317—11)

This invention is directed in general to control circuits, and more specifically to such a circuit which not only accommodates a rapid transfer of energy to effect a first control operation during which energy is stored, but also affords a rapid dissipation or "dumping" of the stored energy to effect a second control operation during a brief time period, thus preparing the control circuit for the next cycle of control operations.

There has always been a problem connected with the rapid operation and release of electromechanical actuating units, especially in systems which include components that must complete a large number of operate-and-release movements during a very brief time span. For example, in operating a relay or solenoid unit, the winding of such an operating unit is inductive, and thus tends to retard the increase of current toward the operating level after the requisite potential difference is applied across the winding, and likewise tends to maintain passage of the current through the coil or winding even after the energizing circuit is interrupted. One expedient sometimes utilized to accelerate the operation of such a unit is to couple an energy storage unit, such as a capacitor, in parallel with the direct current (D.-C.) passage means which normally passes the D.-C. current after a steady state of operation has been attained. Thus if a semiconductor or other switching unit is coupled in series with the operating winding and the capacitor, as soon as the switching unit is closed, a surge of current flows through the switching unit, through the control winding, and through the capacitor. This initial surge of current effects a rapid actuation of the operating unit, which operates and remains operated by reason of the steady state current flowing through the resistor (D.-C. passage means) coupled in parallel with the capacitor. In some control operations, however, it is desired to effect a large number of start-and-stop, or operate-and-release, operations of a given unit even during the space of one second. Accordingly even through rapid initiation or start of a cycle is achieved, some means must be found for rapidly "dumping" or dissipating the energy stored in the capacitor and in the inductive field around the control winding after current flow through the control circuit is interrupted by opening the semiconductor switch. Practical operating conditions require that the resistor coupled in parallel with the capacitor be of an ohmic value sufficiently high to protect the control winding and the semiconductor switch against damage during energization and de-energization of the control winding. This condition results in too large a time constant (determined in conventional manner by multiplying the value of the capacitor by the value of the parallel-coupled resistor) to afford a sufficiently rapid dissipation of the energy stored in the capacitor after the operating circuit is interrupted, thus militating against rapid cycling of the mechanical means regulated by the control winding.

It is therefore a primary object of the present invention to provide a novel protection and energy dissipation circuit for use with a control circuit including a semiconductor switching unit, an inductive operating unit, and a capacitor unit, all coupled in series, and a D.-C. passage unit coupled in parallel with the capacitor, to provide a control circuit across which a potential difference is applied to effect the passage of current through the operating unit in response to the suitable actuation of the semiconductor switching means.

It is a more particular object of the invention to provide such a protection and energy dissipation circuit which effects a rapid dissipation of the energy stored in the capacitor unit and in the magnetic field around the inductive operating unit, while at the same time protecting the semiconductor switching unit against the application of excess voltage.

In one embodiment the novel protective circuit is coupled in parallel with two of the series-coupled units, the inductive operating unit and the capacitor. In such embodiment the protective circuit comprises unidirectional current conduction means, which may be a convention semiconductor diode, so oriented that, as the normal operating current flows through the inductive winding, the net potential difference established across the capacitor and the inductive unit is such that the diode blocks passage of current through the protective circuit. However, as the semiconductor switching unit is opened or rendered non-conductive, and the current passing through the inductive winding begins to collapse and thus induces across such winding a voltage having a polarity opposite to the polarity of the voltage which previously appeared there-across, the polarity of the net voltage now appearing across the diode effects conduction of current through the protective circuit and thus rapidly dissipates the energy stored in the capacitor unit and the energy stored in the inductive operating unit. It is emphasized that, in this embodiment, the connection of the protective circuit across the series circuit which includes both the capacitor and the inductive winding of the operating unit affords a substantial benefit, in that the polarity of the electromotive force (E.M.F.) developed by the collapsing magnetic field is in a sense opposite the polarity established across the capacitor unit during steady-state current flow through the control circuit. Accordingly, the net voltage applied to the semiconductor switching unit is substantially diminished by the offsetting of the E.M.F. developed across the capacitor, thereby protecting the semiconductor switching means as current flow is interrupted.

In another embodiment the protective and energy dissipating circuit includes a second semiconductor switching means which, together with an energy-dissipating resistor, is coupled in parallel with the capacitor in the main control circuit. While current flows in the main control circuit, the net potential applied to the second semiconductor switching means effectively maintains this switching means in the off condition. It is only in response to the interruption of current flow in the main control circuit and consequent collapse of the magnetic field established around the inductive winding that a net potential of opposite polarity is applied to the second semiconductor, and this second switch is turned on to effect a rapid and complete dissipation of the energy stored in the capacitor and in the field around the control winding (the energy dissipation is not literally complete but is more than ample for all practical purposes).

Now in order to acquaint those skilled in the art with the best mode contemplated for making and using the invention, a description therof is set forth in connection with the accompanying drawing, in the several figures of which like reference numerals identify like elements, and in which:

FIGURE 1 is a simplified schematic diagram, partly in block form, illustrating the coupling of the instant invention to a known control circuit;

FIGURE 2 is a schematic diagram depicting one embodiment of the invention; and

FIGURE 3 is a schematic diagram showing another embodiment of the invention.

INTRODUCTION

In FIGURE 1 a fast-operating circuit to actuate an inductive coil or other operator is indicated. As there shown, the circuit includes a first reference point 10, depicted as electrical ground, a second reference point or terminal 11, and a third reference point 12. In accordance with conventional practice, a potential difference can be applied between points 10 and 12 so that, responsive to conduction of semiconductor switch 13, a rapid surge of current passes through capacitor 14 and winding 15 of an operating unit 16 which also includes a contact arrangement 17. Accordingly the requisite operating level of current through the winding 15 is rapidly attained, and thereafter current flow is maintained from terminal 12 through resistor 18, winding 15, and transistor 13 to ground at terminal 10. However, if it is desired to interrupt a circuit by turning off transistor switch 13 and thereafter rapidly closing the switch to again actuate the circuit, there may not be sufficient time for the charge accumulated on capacitor 14 to be substantially dissipated through resistor 18, thereby to effect a release of the contacts indicated at 17 (or other mechanical unit) and provide a control operation which is related to the opening and re-closing of switch 13. Thus, in accordance with the inventive teaching, a protective and energy dissipating circuit 20 is coupled as indicated between the second and third reference terminals 11 and 12, respectively, to afford a rapid and effective dissipation of the energy accumulated across capacitor 14 and the energy stored in the magnetic field around coil 15 responsive to the interruption of this circuit by the opening of semiconductor switch 13.

First embodiment of the invention

In FIGURE 2 the common, input, and output portions of transistor switch 13 are referenced by 13e, 13b and 13c, designating the emitter, base, and collector of this PNP type transistor. Those skilled in the art will recognize that other types of switches or transistors can be utilized, with the proper orientation of the energizing and control potentials for the particular components utilized.

The protective circuit in FIGURE 2 is referenced by numeral 21, and includes a unidirectional current conduction means 22 coupled in series with a conventional D.-C. current passage means These units may be a semiconductor diode and a resistor; identifications and values of the elements in this embodiment will be set out hereinafter.

Assuming initially that a suitable energizing potential difference is applied between terminals 10 and 12 and that the potential applied over conductor 24 with respect to the potential at terminal 10 or ground is sufficiently positive to maintain transistor 13 non-conducting, there is no current flow from terminal 12 through circuit 21, through capacitor 14, or through resistor 18.

Responsive to the application of the proper gating potential over conductor 24, transistor switch 13 is immediately gated on and passes current. Looking from terminal 12 toward the various circuit branches in FIGURE 2, protective circuit 21 appears substantially as an open circuit because of the sense in which diode 22 is coupled in the circuit. Looking toward resistor 18, some resistance to current flow is seen. It is capacitor 14, however, which offers the least impedance to the initial surge of current from terminal 12 through winding 15 and transistor 13 to terminal 10. Accordingly this surge of current occurs and the operating level of current through winding 15 is reached very rapidly, effecting the requisite operation of the associated mechanical component or components (not shown). As the charge or voltage accumulation builds up across capacitor 14, the current surge diminishes but at the same time the level of current flowing through resistor 18 increases rapidly until the steady state operating condition is obtained, with current flowing from terminal 12 through resistor 18, winding 15 and the collector-emitter path of transistor 13 to ground.

Assuming now that a control signal of positive polarity is applied over conductor 24 to turn the transistor off, conduction of this transistor is terminated and the level of current flow through winding 15 begins to diminish. In accordance with well known principles the characteristic of this winding is such that it tends to maintain current flow therethrough, with the energy previously stored in the magnetic field around the winding (as the current increased from zero to the steady state level) being returned to the circuit as the magnetic field collapses. It is important to note that the collapsing magnetic field develops an induced voltage across the winding which is of a polarity opposite to that which appeared across the winding during steady state circuit operation. This induced voltage is in opposition to the polarity of the voltage appearing across the terminals or plates of capacitor 14, and a net potential difference (the algebraic summation of the induced voltage appearing across winding 15 and the voltage or charge accumulated across capacitor 14) is applied across the protective circuit 21. This net potential difference effects conduction across the circuit from terminal 11 through diode 22, resistor 23, resistor 18, and through winding 15 back to terminal 11. At the same time the accumulated charge across capacitor 14 is rapidly drawn off around the path including resistor 18.

It is important to note that the collector of transistor 13 is afforded substantial protection during this dissipation of the energy stored in the capacitor and in the field around the inductive winding. That is, the energy stored in one of these two components is of a polarity opposite that of the other component. With this arrangement, the relay or solenoid including winding 15 reaches the drop-out point more quickly than if the protective circuit 21 were coupled directly across winding 15. With the protective circuit coupled to the power or energizing terminal 12, and with the offsetting action of the voltage induced across coil 15 against the voltage across capacitor 14, the full impact of the induced voltage during current collapse is not applied to collector 13c of the transistor, thereby substantially protecting this important semiconductor unit in the circuit. A considerable economy is thereby effected, in that transistors of lower voltage (and thus of lower cost) can be used in the control circuit.

Second embodiment of the invention

In the embodiment shown in FIGURE 3 the protective circuit is referenced by numeral 25, and this circuit includes a resistor or D.-C. current passage component 26 intercoupled between capacitor 14 and inductive winding 15 in the main control circuit. In accordance with this aspect of the invention, the protective circuit includes a series arrangement of a second semiconductor switching means 27 and an energy dissipating unit 28, shown as a conventional resistor, with these two components coupled in parallel with capacitor 14. The semiconductor or transistor 27 includes an output element or collector 27c, an input element or base 27b, and a common element or emitter, 27e. Base 27b is coupled over a first path which includes a resistor 29 to the junction or common connection between resistor 26 and winding 15, and base 27b is further coupled over a second path comprising a resistor 30 and a unidirectional current conduction means or diode 31 to the common connection between winding 15 and collector 13c of the first semiconductor switch. It is noted that resistor 30 and diode 31 are designated with numerals different from those which specify similar components in the embodiment of FIGURE 2, to emphasize the different circuit placement and difference function of elements 30 and 31 in the embodiment of FIGURE 3.

It is initially assumed that the proper energizing potential difference is applied between reference terminals 10 and 12, and that the control potential applied over conductor 24 (with respect to terminal 10) to base 13b of transistor 13 is such as to maintain this transistor non-conductive, so that no current flows through the main control circuit including winding 15. Responsive to the application of a negative-going signal over conductor 24, transistor 13 is gated on and a surge of current flows from terminal 12 through capacitor 14, resistor 26, winding 15, and the collector-emitter path of transistor 13 to ground at terminal 10. With this surge, the level of current through winding 15 reaches the operating value in a very short time, effecting the desired operation of a contact set, brake, or other mechanical unit (not shown). As the quantity of charge stored in capacitor 14 builds up, the current flow through this capacitor decreases but a steady state D.-C. current flows around the parallel path provided by resistor 18 to maintain current flow through the operating circuit and keep the actuator unit regulated by winding 15 in the energized condition.

As current of substantially constant amplitude flows through the main control circuit, the potential appearing across winding 15 has a polarity indicated by the plus and minus signs on the drawing, and this polarity is such that diode 31 is non-conductive. With this same current flow the polarity of the voltage drop across resistor 26 reverse biases the base-emitter junction to maintain transistor 27 shut-off or non-conducting during the time that current flows in the main energizing circuit.

In accordance with the inventive teaching, as a positive or shut-off signal is applied over conductor 24 to base 13b of transistor 13, this transistor is shut off to effect the interruption of current flow through the control circuit. The voltage induced across coil 15 by the collapsing magnetic field is of a polarity opposite that appearing across the winding during the period in which the steady state current flows therethrough. This oppositely-oriented potential is such that rectifier 31 conducts and current flows around the circuit including winding 15, rectifier 31, and resistors 30 and 29. The potential developed across resistor 29 is of the proper polarity to forward bias the base-emitter junction of transistor 27, thus rapidly gating this transistor on and effecting the completion of an energy dissipation path from one plate of capacitor 14 through dissipating resistor 28 and the collector-emitter path of resistor 27 to the other plate of capacitor 14. Thus the energy stored in this circuit is rapidly and effectively dissipated in a circuit in which the time constant for capacitor discharge is determined, in effect, by the values of capacitor 14 and resistor 28. This is a distinct advantage over requiring the capacitor to discharge through resistor 18, which for practical considerations must be made sufficiently large to limit the flow of direct current through the energizing circuit and protect both winding 15 and transistor 13.

It is noted that transistor 27 is not gated on accidentally, in that the normal flow of operating current through winding 15 provides a voltage drop across this winding such that no current flows through rectifier 31 to base 27b when transistor 13 is conducting. This circuit has been found most effective in actual practice, being operable to respond in periods of the order of three milliseconds and less so that the mechanical operation controlled by collapse of current in winding 15 is effected and the capacitor 14 is substantially discharged, thus being readied to respond to the next control impulse and pass a surge of current in the opposite direction and again attain the requisite level of operating current through the winding 15.

To assist those skilled in the art in making and using the invention, a table of typical operating values utilized successfully in the circuitry of FIGURE 2 and FIGURE 3 is set out hereinafter. Certain considerations, such as the desired operating speed of the component including winding 15, the impedance of this winding, the level of current required to operate the unit associated with winding 15 et cetera, will dictate the variation of circuit values to satisfy different conditions. Accordingly, this table of values is given by way of illustration only and in no sense by way of limitation.

*Figure 2*

| | |
|---|---|
| Transistor 13 | 2N1545. |
| Diode 22 | 1N1487. |
| Resistor 18 | 20 ohms, 25 watts. |
| Resistor 23 | 15 ohms, 2 watts. |
| Capacitor 14 | 50 µf., 50 volts D.-C. |
| Potential at terminal 12 | —24 volts. |

*Figure 3*

| | |
|---|---|
| Transistor 13 | 2N1545. |
| Transistor 27 | 2N1545. |
| Diode 31 | 1N1487. |
| Resistor 18 | 25 ohms, 25 watts. |
| Resistor 26 | 1.5 ohms, 5 watts. |
| Resistor 28 | 3 ohms, 20 watts. |
| Resistor 29 | 56 ohms, 1 watt. |
| Resistor 30 | 30 ohms, 5 watts. |
| Capacitor 14 | 100 µf., 50 volts D.-C. |
| Potential at terminal 12 | —24 volts. |

While only particular embodiments of the invention have been described and illustrated, it is evident that modifications and alterations may be made therein. It is therefore the intention in the appended claims to cover all such modifications and alterations as may fall within the true spirit and scope of the invention.

What is claimed is:

1. For use with a control circuit having a semiconductive switching means, an inductive operating unit and a capacitive surge accommodating unit coupled in series, and a direct current passage means coupled in parallel with said capacitive unit, the improvement which comprises a protective circuit coupled in parallel with that portion of said control circuit including said inductive unit and said capacitive unit, the protective circuit comprising semiconductive blocking means coupled to said inductive operating unit in a sense to block the passage of current through the protective circuit responsive to both a steady-state current and an increasing current flowing through said inductive operating unit, and to pass current through said protective circuit responsive to a decrease in the level of current flowing through said inductive operating unit, thereby to effect the rapid dissipation of energy stored in the capacitive surge accommodating unit and energy stored in the inductive field about the inductive operating unit and prepare the control circuit for the next cycle of operation.

2. For use with a control circuit having a semiconductive switching means, an inductive operating unit coupled to said switching means, a capacitive unit coupled to said inductive operating unit, a direct current passage means coupled in parallel with said capacitive unit, and means for applying a potential difference between one side of said semiconductive switching means and the side of said capacitive unit remote from said inductive operating unit, the improvement which comprises unidirectional current conduction means having a pair of terminals, means for coupling one of said terminals to the common junction of said semiconductive switching means and said inductive operating unit, and means for coupling the other of said terminals to said side of the capacitive unit, the sense of coupling of the unidirectional means being such as to oppose the flow of current therethrough whenever the level of current flow through the inductive operating unit is substantially constant and whenever said current level is increasing, and to admit current flow therethrough in response to a decrease in said current level, thereby expediting the dissipation of energy stored in said capacitive unit and in said inductive unit to prepare the control circuit for another cycle of operation.

3. For use with a control circuit having a transistor switching means comprising input, output, and common elements, an inductive coil coupled to said output element, a capacitor coupled to said inductive coil, a first resistor coupled in parallel with said capacitor, means for applying a potential difference between said common element of the transistor and the side of the capacitor remote from said coil, and means for applying a control signal to said input element of the transistor switching means, a protection circuit comprising unidirectional current conducting means having a cathode element, coupled to the common connection between said output element and said coil, and an anode element, coupled over a resistance means to the side of the capacitor remote from said coil, the unidirectional current conducting means being oriented to prevent the flow of current therethrough when the current in said coil is increasing and is substantially constant and to admit current flow therethrough when the current flowing through said coil is decreasing, whereby the energy stored in said capacitor and said coil is rapidly dissipated and the output element of said transistor switching means is protected against damage.

4. In a control circuit having a first semiconductor switching means, an inductive operating unit, and a capacitive surge accommodating unit coupled in series, and resistance means coupled in parallel with said capacitive unit, the improvement which comprises a protective and energy dissipation circuit including a series circuit comprising a second semiconductor switching means and an energy dissipation unit, and means for coupling the series circuit in parallel with said capacitive unit, said second semiconductor switching means being connected for non-conduction responsive to substantially constant current flow through said inductive unit, and for conduction responsive to decreasing current flow through the inductive unit to rapidly pass energy stored in the capactive unit through said energy dissipation unit for dissipating said stored energy prior to the next cycle of operation in the control circuit.

5. For use with a control circuit having a first semiconductor switching means, an inductive coil coupled to the switching means, a capacitor coupled to the coil, and a first resistor coupled in parallel with the capacitor, the improvement which comprises an energy dissipation circuit also coupled in parallel with said capacitor, said energy dissipation circuit including a second semiconductor switching means and a second resistor, a current blocking unit intercoupled between said second semiconductor switching means and the junction of said first semiconductor switching means and the coil, said current blocking unit being operable to preclude conduction of said second semiconductor switching means when current is flowing through said coil and operable to effect conduction of said second semiconductor switching means when the level of current flow through the coil decreases, to rapidly transfer energy from the capacitor through said second resistor for dissipating the energy stored in the capacitor prior to the next cycle of operation.

6. In a control circuit having first, second and third reference terminals, a first semiconductor switching means intercoupled between the first and second reference terminals for actuation to a first state in which current is passed therethrough and to a second state in which no current is passed therethrough, a first series circuit comprising an inductive coil and a capacitor coupled between the second and third reference terminals, and a first resistor coupled in parallel with the capacitor, the improvement which comprises a protective and energy dissipation circuit including a diode coupled to said second reference terminal, a second series circuit including a second semiconductor switching means and a second resistor, means for coupling the second series circuit in parallel with the capacitor, said diode being coupled to the second semiconductor switching means in a sense to prevent the flow of current through the diode when said first semiconductor switching means is in the first state and to maintain the second semiconductor switching means non-conductive, and to admit current flow through the diode when said first semiconductor switching means is in the second state and render the second semiconductor switching means conductive, to thereby pass the energy stored in said capacitor through the second resistor to effect a rapid dissipation of the stored energy.

7. For use with a control circuit having three reference terminals, a first transistor coupled between the first and second reference terminals, a first series circuit coupled between the second and third reference terminals comprising an inductive coil, a first resistor, and a capacitor, and a second resistor coupled in parallel with the capacitor, the improvement which comprises a dissipation circuit comprising a second transistor and a third resistor forming a second series circuit which is parallel-coupled with the capacitor, a fourth resistor coupled between the second transistor and the junction between the coil and the first resistor, and a third series circuit including a diode and a fifth resistor coupled between said second reference terminal and the junction between the fourth resistor and the second transistor, both the diode and the second transistor being connected to be non-conductive responsive to passage of current through the first series circuit and to be rendered conductive responsive to a decrease in the current flow through said first series circuit, whereby the energy stored in the coil is rapidly dissipated in the fourth and fifth resistors and the energy stored in the capacitor is rapidly dissipated in the third resistor to prepare the control circuit for the next cycle of operation.

References Cited by the Examiner
UNITED STATES PATENTS

| | | | |
|---|---|---|---|
| 1,966,077 | 7/1934 | Nyman | 317—11 |
| 3,049,650 | 8/1962 | Greenblatt | 317—148.5 |
| 3,064,165 | 11/1962 | Kennedy | 317—148.5 |

MILTON O. HIRSHFIELD, *Primary Examiner.*

S. BERNSTEIN, STEPHEN W. CAPELLI, *Examiners.*

J. D. TRAMMELL, *Assistant Examiner.*